United States Patent

[11] 3,634,637

[72] Inventors Shigeru Suzuki;
　　　　　　　Yasumori Nagahara, both of Yokohama, Japan
[21] Appl. No. 31,693
[22] Filed Apr. 24, 1970
[45] Patented Jan. 11, 1972
[73] Assignee Ricoh Co., Ltd.
　　　　　　　Tokyo, Japan

[54] DEVICE FOR CYCLING PREDETERMINED NUMBER OF OPERATIONS OF CONTROLLED MACHINE OR THE LIKE
4 Claims, 5 Drawing Figs.

[52] U.S. Cl. .................................................. 200/61.41, 74/142, 355/13
[51] Int. Cl. .................................................. H01h 3/16
[50] Field of Search .................................................. 200/61.41; 74/142; 355/13

[56] References Cited
UNITED STATES PATENTS
3,456,515　7/1969　Koizumi .................................................. 74/142
3,503,677　3/1970　Uchiyama .................................................. 355/13
2,735,915　2/1956　Hagen .................................................. 200/61.41

Primary Examiner—Robert K. Schaefer
Assistant Examiner—M. Ginsburg
Attorneys—Henry T. Burke, Lester W. Clark, Robert S. Dunham, P. E. Henninger, Thomas F. Moran, Gerald W. Griffin, R. Bradlee Boal, Christopher C. Dunham and Robert Scobey ABSTRACT: The invention provides a device for cycling a predetermined number of operations of a controlled machine, such as a photocopying machine, by presetting a dial and depressing a start button of the controlled machine without actuating a switch incorporated in the device. The switch is electrically coupled to the controlled machine such that when the switch is in a first position the machine is automatically stopped after accomplishing one cyclic operation. The switch is moved to a second position by presetting the dial to a predetermined number when more than one operation is desired to be cycled, whereby the predetermined number of operations may be continuously cycled. The switch is moved back to the first position when the next-to-last of the operations has been completed.

PATENTED JAN 11 1972

INVENTORS
SHIGERU SUZUKI
YASUMORI NAGAHARA

BY Lester W Clark

ATTORNEY

DEVICE FOR CYCLING PREDETERMINED NUMBER OF OPERATIONS OF CONTROLLED MACHINE OR THE LIKE

BACKGROUND OF THE INVENTION

The present invention relates to a device for cycling a predetermined number of operations of a controlled machine and more particularly a device for cycling a predetermined number of operations of a controlled machine which operations are automatically started by presetting a dial and depressing a start button of the machine and automatically stopped when the last of the predetermined operations is accomplished.

There is a wide variety of machines, equipment, apparatus, processes, etc., whose cyclic operations are desired to be cycled a predetermined number of times. One typical example is a photocopying machine, especially an automated photocopying machine whose cyclic operation generally consists of automatic feeding of a copy paper, charging this copy paper, projecting a light image to be reproduced upon the charged copy paper thereby forming a latent electrostatic image, developing the exposed copy paper and fixing the developed image. When a plurality of copies are desired from one original to be reproduced, the above cyclic operations must be repeated and when the last copy is discharged out of the photocopying machine the operation thereof must be automatically stopped.

A wide variety of the devices of the type described above is known, and these devices generally incorporate switches which are electrically connected to the control circuits or the like of the controlled machines so that when the switches are actuated, the controlled machines are automatically stopped after accomplishing a predetermined number of cyclic operations. But when it is desired to start the controlled machines again, the switches must be opened or closed from the exterior of the devices in order to actuate the control circuits or the like of the controlled machines. The devices in the prior art have therefore undesired operation aspects. That is, the operation is tedious. The devices so designed based upon the prior art as to overcome these defects would become very complicated with an increased number of structural parts, which contributes materially to the cost.

SUMMARY OF THE INVENTION

It is therefore the primary object of the present invention to provide a device for cycling a predetermined number of operations of a controlled machine and automatically stopping the controlled machine after the predetermined number of cyclic operations has been accomplished.

It is another object of the present invention to provide a device for automatically cycling a predetermined number of operations of a controlled machine just by setting a dial or the like and depressing a start button or the like of the controlled machine.

It is a further object of the present invention to provide a device for automatically cycling a predetermined number of operations of a controlled machine of the character described above which is simple in form with a minimum of structural parts, reliable and simple in operation, small in size and light in weight.

It is a further object of the present invention to provide a device of the character described above particularly suited for use in a photocopying machine in order to reproduce a plurality of copies from one original.

It is a further object of the present invention to provide a device of the character described above which can be readily installed upon and interconnected with a controlled machine.

To attain the above and other objects, the present invention provides a device for cycling a predetermined number of operations of a controlled machine comprising in combination means for actuating a switch which is so electrically connected to a control circuit or the like of said controlled machine that when said switch is in a first position, said control circuit or the like may be disengaged, thereby stopping automatically said controlled machine after it accomplishes one cyclic operation or the last of said predetermined number of operations; means for actuating said switch-actuating means adapted to be displaced in steps in response to the accomplishment of each of said predetermined number of operations so as to return the switch to its first position after the last of the predetermined number of operations is accomplished; lever means operated by the controlled machine and adapted to make one pivotal motion in response to the accomplishment of each of said predetermined number of cyclic operations for actuating the switch-actuating means in steps; and retaining means for engagement with said switch-actuating means so as to retain said switch-actuating means selectively in either of two positions in the first position the switch-actuating means actuating the switch and in a second position the switch-actuating means turning off said switch so that said predetermined number of operations may be continuously cycled.

According to one aspect of the present invention, said switch-actuating means in said first position may be switched to said second position when the first one of said predetermined number of operations is accomplished and automatically switched back to said first position when the last one of said predetermined number of operations is started.

According to another aspect of he present invention, said switch-actuating means remains in said first position when only one operation is desired to be cycled.

When a desired number of cyclic operations of the controlled machine is preset by a dial of the device of the present invention and when a start button or the like of the controlled machine is depressed, said desired number of cyclic operations are automatically carried out continuously without any other operation for starting the controlled machine and the machine is automatically stopped after said desired number of operations are accomplished.

The above and other objects, features and advantages of the present invention will become more apparent from the following description of the preferred embodiment thereof taken in conjunction with the accompanying drawing:

DESCRIPTION OF THE PREFERRED EMBODIMENT

The present invention will be described with particular reference to the case in which the device of the present invention is coupled to a photocopying machine, but it will be understood that the device of the present invention can be coupled to or installed in any of the machines whose operations are desired to be cycled for a predetermined number of times.

Figure 1:
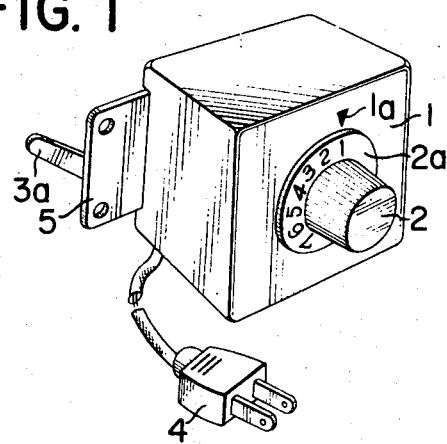
FIG. 1 is a perspective view of one embodiment of a device for cycling a predetermined number of operations in accordance with the present invention.
Figure 2:
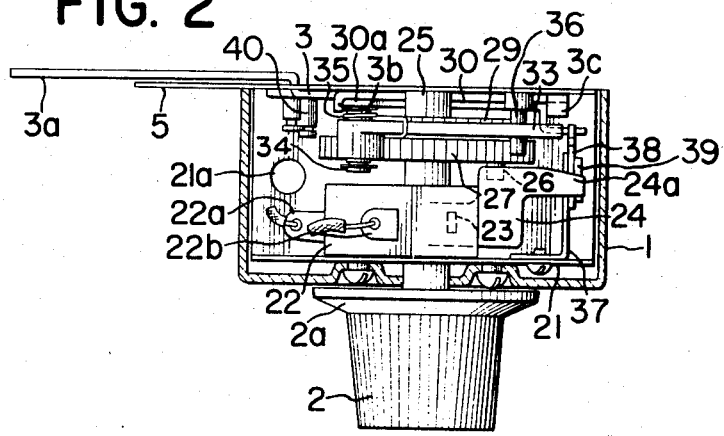
FIG. 2 is a top view thereof.

First referring to FIG. 1 illustrating one embodiment of the present invention, reference numeral 1 designates a housing; 2, a presetting knob having a dial 2a bearing the numerals "1" to "7" one of which is set to an index mark 1a marked upon the housing 1 depending upon a desired number of operation to be cycled; 3a, one arm of a coupling lever 3 to be described in more detail hereinafter for coupling to a controlled photocopying machine (not shown) whose operations are cycled for a number of times preset by the dial 2a; and 4, a plug for electrically connecting to the controlled machine a switch 22 (FIG. 2) incorporated in the device of the present invention in order to stop or continue the operation of the controlled machine as will be described in more detail hereinafter. The device of the present invention may be readily installed upon the controlled machine through a retaining member 5 in a simple manner.

One of the novel features which are believed to be characteristic of the present invention resides in the fact that the switch 22 is normally in a first position in which for example, a control circuit of the controlled photocopying machine is operated in such a manner that the photocopying machine is automatically stopped after accomplishing one cyclic operation thereof, that is, after reproducing one copy. Switch 22 is operable from that first position to a second position in which the controlled machine runs continuously. Either of the first or second positions may be the closed position, depending upon the design of the particular circuitry which it controls.

Next referring to FIGS. 2 to 5, the switch 22 is mounted upon the upper portion of the front wall of a chassis 21 and the lead wires 4a and 4b from the terminals 22a and 22b of the switch 22 extend out of the device through a hole 21a formed through the bottom of the chassis 21 and are connected to the plug 4. A switch-actuating lever 24 is pivotably carried at its one end by a shaft 21c journaled to the chassis 21 for selectively raising an actuating element 23 (See FIG. 3) of the switch 22 or allowing it to drop. A presetting or control shaft 25 is rotatably journaled to the chassis 21 below the switch-actuating lever 24 and the knob 2 is firmly fixed to the outer end of the presetting shaft 25. An index star wheel 27 having a projection 26 for engagement with the switch-actuating lever 24 is carried by the presetting shaft 25 and is adapted to be restrained intermittently by an inverted V-shaped detent 28a formed at the free end of a resilient member 28 which in turn is securely fixed to the chassis 21.

The presetting or index shaft 25 also carries a ratchet wheel 29 having a smooth peripheral sector 29a (See FIG. 4) and a toothed portion 29b which is intermittently rotated one tooth at a time in response to one pivotal movement of a coupling lever mechanism as will be described in more detail hereinafter, so that the star wheel 27 is angularly displaced in steps in the direction indicated by the arrow a in FIG. 3.

The coupling lever 3 and a lever 30 coactive therewith are pivotably coaxially carried by a pin 21b which in turn is fixed to the chassis 21. The arm 3a extends beyond the housing 1 through an opening (not shown) formed through the chassis 21. The coupling lever 3 is normally biased by a spring 31 so as to rotate in the clockwise direction in FIG. 3 but this rotation is limited because the arm 3a engages the upper edge of the opening. The arm 3a is adapted to be pushed and rotated in the counterclockwise direction in FIG. 3 by a coupling member (not shown) of the photocopying machine, so that the arm 3a makes one pivotal movement about the pin 21b in response to one operation of the photocopying machine, that is each time one copy is discharged out of the photocopying machine.

One arm 30a of the lever 30 is in engagement with an inwardly bent central arm 3b of the coupling lever 3. The other arm 30b of the lever 30 is connected through a coil spring 32 to an inwardly bent arm 3c of the coupling 'ever 3, so that the lever 30 is normally biased in the counterclockwise direction so as to press the arm 30a against the arm 3b of the coupling lever 3. Therefore it is seen that the lever 30 makes a pivotal movement in response to the pivotal movement of the coupling lever 3. It should be noted that the spring 32 also serves to damp the pivotal movement of the lever 30 when the coupling lever 3 makes an excessive pivotal movement.

Figure 3:
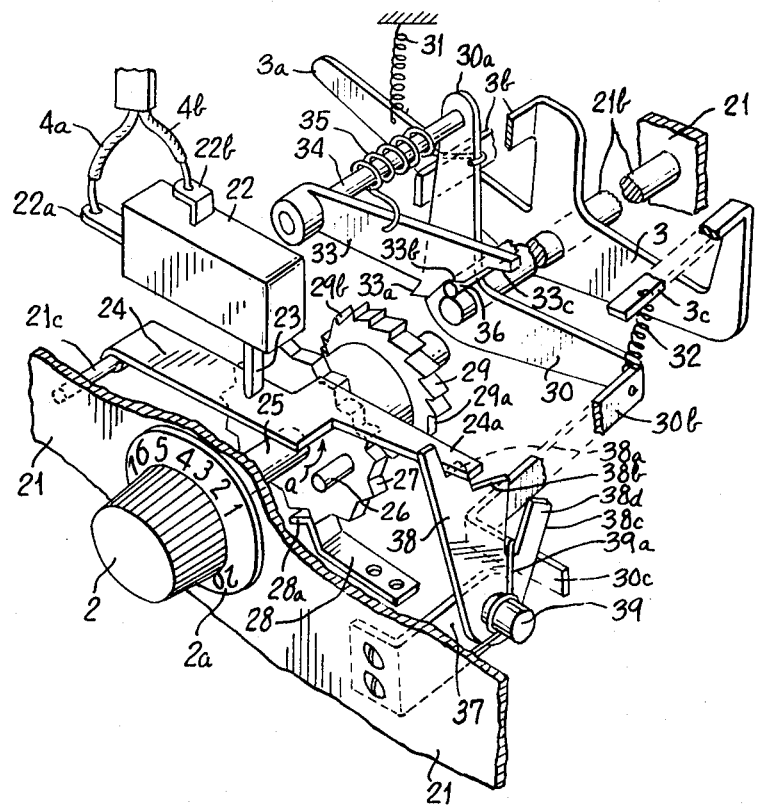
FIG. 3 is a perspective exploded view thereof.

The base of a pawl member 33 for engagement with the teeth of the ratchet wheel 29 is loosely carried by a shaft 34 extending from the arm 30a of the lever 30 and is normally biased by a torsion spring 35 fitted over the shaft 34 and engaging the pawl member 33 and the arm 30a so as to rotate the pawl member in the clockwise direction in FIG. 3. The pawl member 33 has two stepped portions 33b and 33c and when the arm 3a of the coupling lever 3 is in an upward position (the position shown in FIG. 3), the stepped portion 33b of the pawl member 33 is in engagement with an escapement pin 36, fixed to the chassis 21 so that the pawl 33a is spaced from the ratchet wheel 29.

Figure 5:
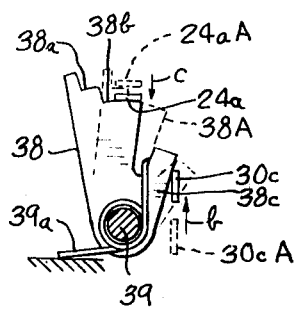
FIG. 5 is an elevational view of a retaining member used in the device.

A bifurcated retaining member or latch 38, having two stepped portions 38a and 38b formed at the upper end of one arm thereof is pivotably fixed by a pin 39 to a bracket 37 which in turn is securely fixed to the chassis 21. As shown in FIG. 5 the retaining member 38 is normally biased by a spring 39a fitted over the pin 39 and having one end engaging the chassis 21 and the other hooked over a second arm 38d of the retaining member so that the member is rotated in the clockwise direction, thereby normally engaging the sloping edge 38c of the arm 38d of the retaining member 38 with a laterally bent portion 30c of the arm 30b of the lever 30. It is therefore readily seen that when the switch-actuating lever 24 is pushed upwardly by the projection 26 of the star wheel 27, the stepped portion 38a is rotated into engagement with the leading end 24a of the switch-actuating lever 24, thereby holding the switch-actuating lever 24 at its raised position. That is, the switch-actuating element 23 is raised so that the switch 22 is actuated.

Figure 4:
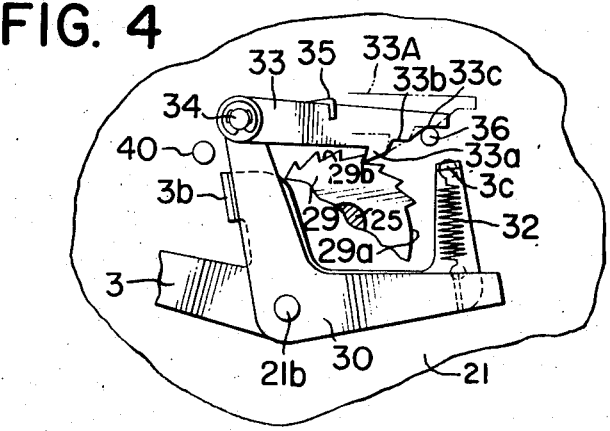
FIG. 4 is an elevational view of levers, a pawl member and a portion of a ratchet used in the mechanism of the device, and showing the pawl member engaging the ratchet.

Next the mode of operation will be described hereinafter. Let it be assumed that five copies are desired from one original. The numeral "5" upon the dial 2a is set to the index mark 1a as shown in FIG. 3 so that both the star wheel 27 and the ratchet wheel 29 are rotated and the projection 26 of the star wheel 27 is angularly displaced to a predetermined position. More specifically, the fourth tooth groove from the smooth peripheral sector 29a of the ratchet wheel 29 is positioned in opposed relation with the pawl 33a. When a print button of the photocopying machine is depressed, the first photocopying operation is started automatically and after one copy is discharged out of the machine the arm 3a of the coupling lever 3 is pushed downwardly by the coupling member (not shown) of the photocopying machine which is actuated each time one copy is reproduced. Therefore, both of the levers 3 and 30 are caused to rotate in the counterclockwise direction. The pawl member 33 has its stepped portion 33c engaged with the escapement pin 36 as shown in FIG. 4, because the pawl member 33 is displaced to left in FIG. 4 by the rotation of lever 30 and is forced downwardly by the spring 35. That is, the pawl member 33 is lowered from the position 33a indicated by the dot-dash lines in FIG. 4 to the position indicated by the solid lines so that the pawl 33a engages the ratchet wheel 29. As the pawl member 33 is displaced to the left, the pawl 33a rotates the ratchet wheel 29 by one tooth in the counterclockwise direction indicated by the arrow a in FIG. 3. Thereafter the pawl 33a disengages upwardly from the ratchet wheel 29 as the pawl member 33 is displaced to the right. The displacement of the pawl member 33 to the left is precisely limited by a fixed stop 40.

Upon the rotation of the lever 30 in the counterclockwise direction, the laterally bent portion 30c of the lever 30 is displaced from the position 30cA indicated by the dot-dash lines in FIG. 5 in the direction indicated by the arrow b. The laterally bent portion 30c engages the retaining member 38, which has been held by the leading end 24a of the switch-actuating lever 24 at the position 38A indicated by the dot-dash lines, and is effective to displace the retaining member to the position indicated by the solid lines. Consequently, the leading end 24a indicated by the dot-dash lines to raise the switch-actuating element 23 for closing the switch 22, is displaced downwardly in the direction indicated by the arrow c to the position indicated by the solid line so that the leading end 24a is now held in position upon the stepped portion 38b of the retaining member 38. As the lever 24 moves downwardly the switch-actuating element 23 is lowered, thereby opening the switch 22. Therefore the control circuit of the photocopying machine, which is controlled by the switch 22, remains closed so that the next photocopying operation is automatically started and the device of the present invention is operated in a similar manner as described hereinabove, thereby advancing further the ratchet wheel 29 by one tooth in response to the next pivotal movement of the levers 3 and 30. In the second and subsequent operations of the photocopying machine, the arm 38d of the retaining member 38 has already moved away from the path of the bent portion 39c of the lever 30 so that the arm 38d of the retaining member 38 remains stationary.

Consequently, the switch-actuating element 23 and lever 24 are not displaced so that the switch 22 remains opened.

When the ratchet wheel 29 is rotated by four teeth in a similar manner as described above, the smooth peripheral sector 29a of the ratchet wheel 29 is in opposed relation with the pawl 33a. The projection 26 of the star wheel 27 has been raised in steps in response to intermittent rotation of the ratchet wheel 29 and is in engagement with the switch-actuating lever 24 so as to push it upwardly, whereby the switch-actuating element 23 is raised, thereby closing the switch 22. The leading end 24a of the switch-actuating lever 24 is also raised by the projection 26 from the stepped portion 38b of the retaining member 38 and automatically engages the stepped portion 28a because the retaining member 38 is imparted with the tendency to rotate in the clockwise direction by the spring 39a. The switch 22 is thereby closed after the next to last copy has been produced so that the photocopying machine is automatically stopped when the last of the predetermined number of five copies is produced.

If the projection 26 is not moved away from the switch-actuating lever 24 so as to open the switch 22, only one copy is obtained when the print button is depressed. In this case, the numeral "1" upon the dial 2a is set to the index mark 1l.

When the numeral "2" upon the dial 2a is set to the index mark 1a, the groove between the first and second teeth of the ratchet wheel 29 from the smooth peripheral sector 29a thereof is so positioned as to oppose the pawl 33a so that upon depression of the print button, two copies are obtained continuously and then the photocopying machine is automatically stopped. In a similar manner when the index knob is rotated so as to set the numeral "3" upon the dial 2a to the index mark 1a, the second groove between the second and third teeth from the nontooth portion 29a of the ratchet wheel 29 is so positioned as to oppose the pawl 33a, so that upon depression of the print button, three copies are automatically obtained, and so on.

When the numeral "1" upon the dial 2a is set to the index mark 1a, that is when the switch 22 is closed, the pawl 33a engages the smooth peripheral sector 29a of the ratchet wheel 29 upon reproduction of one copy, so that the ratchet wheel 29 and consequently the star wheel 27 are not rotated at all. Therefore, the projection 26 of the star wheel 27 remains in the same position, pushing the switch-actuating lever 24 and switch-actuating element 23 upwardly so that the switch 22 remains closed.

From the foregoing, it is seen that when a desired number of copies is set by the dial 2a and the print button is depressed, the photocopying machine is automatically started without the need of actuating the retaining member 38 from the outside of the device. The switch-actuating lever 24 need not operate the switch 22 into its first position as it has remained in the first position since the time when the last copy of the previous photocopying operations was obtained. If only one copy is desired, the photocopying machine shuts off after the copy has been produced. When it is desired to produce more than one copy, the switch 22 is moved into its second position by the element 23, the lever 24 and the retaining member 38 after the first copy has been produced. The switch 22 is moved back onto its first position prior to production of the last copy. The photocopying machine is automatically stopped after the last copy is produced.

The present invention has been so far described with particular reference to the preferred illustrative embodiment thereof, but it will be understood that variations and modifications can be effected without departing from the true spirit of the present invention as described hereinabove with reference to the accompanying drawing and as defined in the appended claims.

We claim:

1. A device for cycling a predetermined number of operations of a controlled machine having a control circuit comprising in combination:
   a. a switch electrically connected to said control circuit of said controlled machine,
   b. means for actuating said switch such that when said switch is actuated said control circuit is disengaged, thereby stopping said controlled machine after one cyclic operation,
   c. means for operating said switch-actuating means adapted to be displaced from a preset position in steps in response to the accomplishment of each of the predetermined number of cyclic operations so as to operate said switch-actuating means when the last one of the predetermined number of cyclic operations is started,
   d. lever means operated by said controlled machine adapted to make one pivotal movement in response to the accomplishment of each of the predetermined number of cyclic operations for displacing in steps said means for operating said switch-actuating means,
   e. retaining means for engagement with said switch-actuating means so as to retain said switch-actuating means selectively in either of two positions, in a first position said switch-actuating means actuating said switch and in a second position said switch-actuating means disengaging said switch so that the predetermined number of cyclic operations may be continuously cycled, said retaining means actuated by said lever means to move said switch-actuating means from said first position to said second position after the first one of the predetermined number of cyclic operations is accomplished, said retaining means permitting movement of said switch-actuating means from said second position to said first position when the next-to-last operation of the predetermined number of cyclic operations is accomplished, and
   f. means for presetting said means for operating said switch actuating means at a position corresponding to the predetermined number of cyclic operations.

2. Preselector apparatus for controlling the actuation of a switch by a cyclically operated member, comprising:
   a. a switch-actuating element movable between first and second positions;
   b. latch means movable between a latching position in which it holds said switch-actuating element in its first position and a releasing position in which it allows said switch-actuating element to move to its second position;
   c. manually operable means for preselecting a number of cycles of operation greater than one of said cyclically operated member, said manually operable means including:
      1. a manually operable member movable from a normal position in which it holds said switch-actuating element in its first position, to any of a predetermined number of off-normal positions in which it allows said switch-actuating element to move to its second position;
      2. ratchet means, means whereby said ratchet means is actuated by said cyclically operated member for stepwise restoration of said manually operable member from any of its off-normal positions to its first position; and
   d. means operated by said cyclically operated member and effective on the cycle of operation after the switch-actuating element is moved to its first position to move said latch means to its releasing position to allow said switch-actuating element to move to its second position.

3. Preselector apparatus in accordance with claim 2 wherein said ratchet means restores said manually operable member to its first position after the next-to-last cycle of operation is accomplished.

4. Cycle count preselector apparatus, comprising:
   a. a cyclically operated member;
   b. a control element movable between a first position in which it stops the cyclically operated member after one cycle and a second position in which it permits the cyclically operated member to continue through a plurality of cycles;
   c. retainer means biased toward a retaining position in which it holds the control element in its first position and movable therefrom to a releasing position in which it allows the control element to be moved by its bias to its second position;

d. manually operable means for preselecting a number of cycles of operation of said cyclically operated member;

e. means supporting the manually operable means for movement between a normal single cycle position and any of a plural-cycle-counting sequence of off-normal position; and f. a part fixed to said manually operable means for concurrent movement therewith, said part having a path of movement intersecting that of the control element, said part being effective only when the manually operated means moves to its single-cycle position to move the control element to its first position;

g. ratchet means actuated on each cycle of said cyclically operated member for stepwise restoration of the manually operable means from any of its off-normal positions toward its normal position; and h. means operated by the cyclically operated member and effective on the cycle of operation after said control element is moved to its first position to move the retainer means to its releasing position and thereby to allow the control element to move to its second position; so that the control element moves to its second position only when the manually operable means is in one of its off-normal positions and the retainer means is in its releasing position; and i. means effective when the control element is in its second position to hold the retainer means in its releasing position.

* * * * *